United States Patent
Yamaguchi et al.

(10) Patent No.: US 7,324,834 B2
(45) Date of Patent: Jan. 29, 2008

(54) SPEAKER SYSTEM

(75) Inventors: Takuro Yamaguchi, Tokyo (JP);
Yoshio Koike, Tokyo (JP); Hideo Koreeda, Tokyo (JP); Yuichi Sakamoto, Tokyo (JP)

(73) Assignee: Foster Electric Co., Ltd., Tokyo (JP)

( * ) Notice: Subject to any disclaimer, the term of this patent is extended or adjusted under 35 U.S.C. 154(b) by 50 days.

(21) Appl. No.: 11/203,095

(22) Filed: Aug. 15, 2005

(65) Prior Publication Data
US 2006/0183507 A1    Aug. 17, 2006

Related U.S. Application Data

(62) Division of application No. 10/504,927, filed as application No. PCT/JP02/02689 on Mar. 20, 2002.

(51) Int. Cl.
*H04B 1/38* (2006.01)
*H04M 1/00* (2006.01)

(52) U.S. Cl. .................. 455/556.1; 455/569.1; 455/572; 455/575.1; 381/182; 381/186; 381/386

(58) Field of Classification Search ............ 455/556.1, 455/569.1, 572, 575.1, 575.6, 573; 381/182, 381/186, 386
See application file for complete search history.

(56) References Cited

U.S. PATENT DOCUMENTS

| | | | |
|---|---|---|---|
| 5,309,502 A | 5/1994 | Hirai | |
| 5,884,191 A | 3/1999 | Karpus et al. | |
| 5,898,137 A | 4/1999 | Saito | |
| 5,966,285 A | 10/1999 | Sellers | |
| 6,035,221 A * | 3/2000 | Snyder et al. | 455/569.1 |
| 6,058,319 A | 5/2000 | Sadler | |
| 6,073,031 A | 6/2000 | Helstab et al. | |
| 6,076,000 A * | 6/2000 | Lee | 455/569.2 |
| 6,374,148 B1 | 4/2002 | Dharmarajan et al. | |
| 6,766,175 B2 | 7/2004 | Uchiyama | |
| 2001/0006336 A1 * | 7/2001 | Yi et al. | 320/115 |
| 2002/0118314 A1 * | 8/2002 | Pan et al. | 348/839 |

FOREIGN PATENT DOCUMENTS

| | | |
|---|---|---|
| JP | 10-98512 | 4/1998 |
| JP | 10-285254 | 10/1998 |

* cited by examiner

*Primary Examiner*—Matthew Anderson
*Assistant Examiner*—Tuan Pham
(74) *Attorney, Agent, or Firm*—Finnegan, Henderson, Farabow, Garrett & Dunner

(57) ABSTRACT

A speaker system functioning as a stand capable of power supply to a mobile phone and hand-free communication and being capable of derived surround reproduction or stereo reproduction is provided. An enclosure (201), on which a mobile phone is placed, includes therein supply means (209) for supplying electric power to the mobile phone, communication means (213) for enabling hand-free communication by the mobile phone through a microphone (211), processing means for introducing signals from the mobile phone and performing a predetermined processing, and a pair of speakers (215, 215') provided on both sides of the enclosure in a state in which back sides thereof are substantially face to each other for generating sounds based on output signals from the processing means.

5 Claims, 14 Drawing Sheets

SPEAKER SYSTEM

RELATED APPLICATIONS

This application is a divisional of U.S. application Ser. No. 10/504,927 filed Aug. 19, 2004, which is a § 371 of International Application No. PCT/JP02/02689 filed Mar. 20, 2002, the contents of both of which are incorporated herein by reference.

TECHNICAL FIELD

The present invention relates to a speaker system and, more specifically, to a speaker system capable of placing a mobile phone thereon and, in this state, capable of supplying electric power to the mobile phone and generating sounds based on incoming signals from the mobile phone.

BACKGROUND ART

Charging of an internal battery of a mobile phone is performed in a state in which the mobile phone is placed on a stand. A so-called hand-free set including such a stand provided with a microphone, a speaker, and so on for enabling communication in a state in which the mobile phone is placed on the stand is disclosed in JP-A-10-98512 and JP-A-10-285254.

In recent years, a music delivery service via a mobile phone is in the course of coming into practical use. In the aforementioned hand-free set, since arrangement of stereo reproduction is not taken into account, only monaural reproduction is available even when taking advantage of such music delivery service. Also, although it is necessary to arrange a plurality of speakers at a suitable distance in order to realize reproduction in association with stereo feeling, since such a stand is downsized in association with downsizing of the mobile phone, such an arrangement of the speakers is impossible to realize.

As an improved stereo reproduction, there exists reproduction which provides audiences with "surround" feeing, so-called derived surround reproduction. However, reproduction of such type is also impossible in the aforementioned hand-free set. The term "derived surround reproduction" represents generation of sound which provides the audience with a feeling as if there were sound sources not only in front, but also on the sides or in the back from a plurality of speakers arranged only in front.

In view of the aforementioned problems, it is an object of the present invention to provide a speaker system capable of derived surround reproduction or stereo reproduction, which also functions as a stand capable of power supply to a mobile phone and of hand-free communication.

DISCLOSURE OF THE INVENTION (1) In order to achieve the above described object, an aspect of the present invention is a speaker system including: an enclosure having a placing section on which a mobile phone is placed in a state in which a user can operate; supply means for supplying electric power from the side of the enclosure to the mobile phone placed on the placing section; a microphone provided on the enclosure; communication means for allowing a user to communicate through the mobile phone placed on the placing section through the microphone; introducing means for introducing signals from the mobile phone placed on the placing section to the interior of the enclosure; processing means for performing a predetermined processing on the introduced signals; and a pair of speakers provided on both sides of the enclosure in such a manner that back sides thereof substantially face to each other for generating sounds based on the output signals from the processing means.

In this aspect of the invention, since the pair of speakers generating sounds based on the output signals from the processing means are provided on both sides of the enclosure in such a manner that the back sides thereof substantially face to each other, derived surround reproduction or stereo reproduction is achieved even when the enclosure is downsized.

(2) In order to achieve the aforementioned object, another aspect of the present invention is a speaker system including: an enclosure having a placing section on which a mobile phone is placed in a state in which a user can operate; supply means for supplying electric power from the side of the enclosure to the mobile phone placed on the placing section; a microphone provided on the enclosure; communication means for allowing a user to communicate through the mobile phone placed on the placing section through the microphone; introducing means for introducing signals from the mobile phone placed on the placing section to the interior of the enclosure; the other introducing means for introducing signals from an external signal source into the enclosure; selecting means for selecting any one of the signals introduced by the introducing means and the signals introduced by the other introducing means; processing means for performing a predetermined processing on the selected signals; and a pair of speakers provided on both sides of the enclosure in such a manner that back sides thereof substantially face to each other for generating sounds based on the output signals from the processing means.

According to this aspect of the invention, since the pair of speakers for generating sounds based on the output signals of the processing means are provided on both sides of the enclosure in such a manner that back sides thereof substantially face to each other, derived surround reproduction or stereo reproduction is achieved even when the enclosure is downsized.

In addition, since the signals which the processing means processes are adapted to be selected by the selecting means, the signals from the mobile phone or the signals from the external signal source may be selectively reproduced.

In the invention according to the respective aspects, preferably, output means for outputting output signals of the processing means to the outside of the enclosure is provided, so that it enables supply of the signals to the external equipment such as a headphone.

In the invention according to the respective aspects, preferably, the signals introduced by the introducing means are music signals delivered to the mobile phone placed on the placing section, so that it allows the user to receive a music delivery service.

In the invention according to the respective aspects, preferably, the predetermined processing is a processing for derived surround reproduction, so that it allows the audience to have a surround feeling.

In the invention according to the respective aspects, preferably, the predetermined processing is a processing for stereo reproduction, so that it allows the audience to have a stereo feeling.

(3) In order to achieve the aforementioned object, still another aspect of the present invention is a system having a function for charging a battery of a mobile phone placed on a placing section including: a connector for disdributing power and sending/receiving of signals with respect to the placed mobile phone; amplifying means for amplifying sound signals received from the mobile phone via the connector; speakers for outputting sounds amplified by the amplifying means; characterized in that center axes of at least a pair of speakers are directed at an angle within a range between 30° and 90° in the lateral horizontal direction with respect to the front and within an elevating angle between 0° and 60°.

In the invention according to this aspect, when charging the battery of the placed mobile phone, power distribution and reception/sending of signals are being performed via the connector with respect to the placed mobile phone, and the sound signals received from the mobile phone via the connector is amplified by the amplifying means and the amplified sound is outputted from the speakers. The amplifying means is preferably capable of amplifying the derived surround signals. Alternatively, the amplifying means is preferably capable of amplifying the stereo signals.

Since the sound is outputted from the speakers installed in such a manner that the center axes of at least a pair of speakers are directed at an angle within a range between 30° and 90° in the lateral horizontal direction from the front and within an elevating angle between 0° and 60°, it is suitable for derived surround reproduction or stereo reproduction of music information delivered by the music delivery service.

When outputting the sound from the speakers installed in such a manner that the center axes of at least a pair of speakers are directed at an angle within a range of 45° from the front, a further suitable state for the spread of sound during derived surround reproduction or stereo reproduction is achieved.

When the sound is outputted from the speakers installed in such a manner that the center axes of at least a pair of speakers are directed at an angle within a range between 30° and 45° from the front, a further suitable state for derived surround reproduction or stereo reproduction in a state of being placed on a table or a desk is achieved.

Derived surround reproduction or stereo reproduction described above is suitable for outputting stereo sounds from the mobile phone which receives music information via the music delivery service.

BEST MODE FOR CARRYING OUT THE INVENTION

Figure 1:
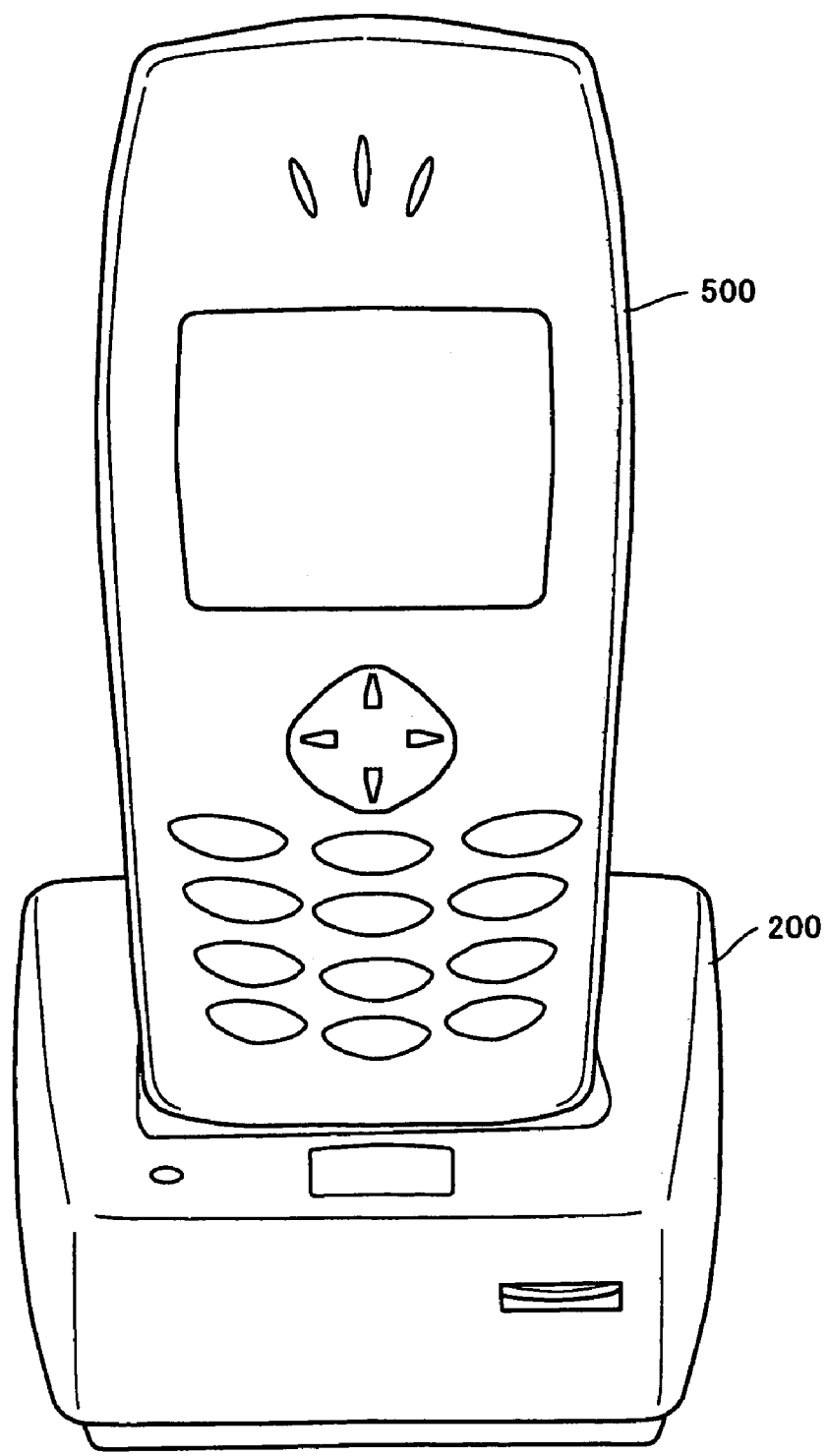
FIG. 1 is a schematic drawing showing an example of a speaker system according to the best mode for carrying out the present invention in a state in which a mobile phone is placed thereon.
Figure 2:
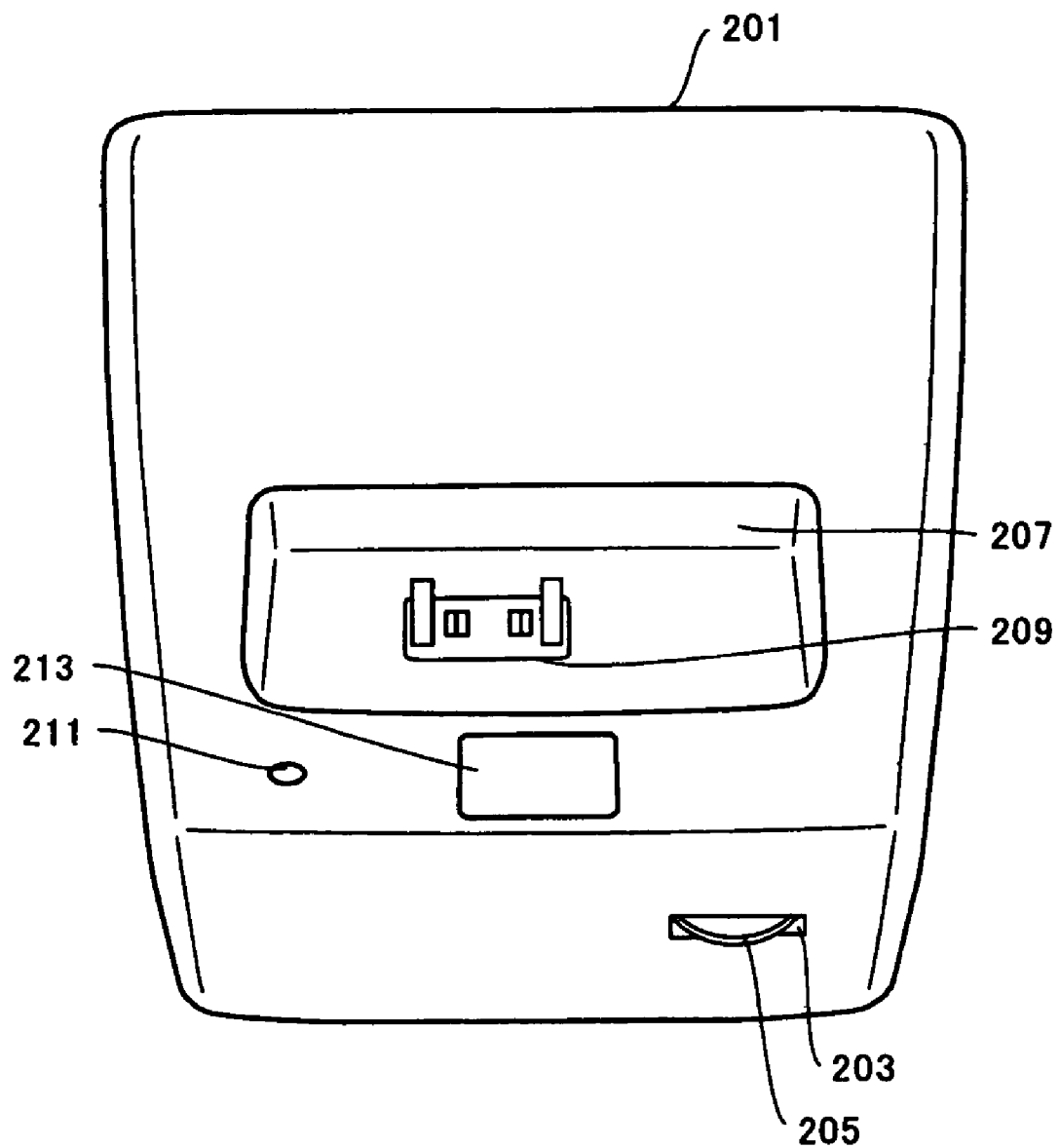
FIG. 2 is a schematic drawing showing an appearance of the example of the speaker system according to the best mode for carrying out the present invention viewed from above in front.
Figure 3:
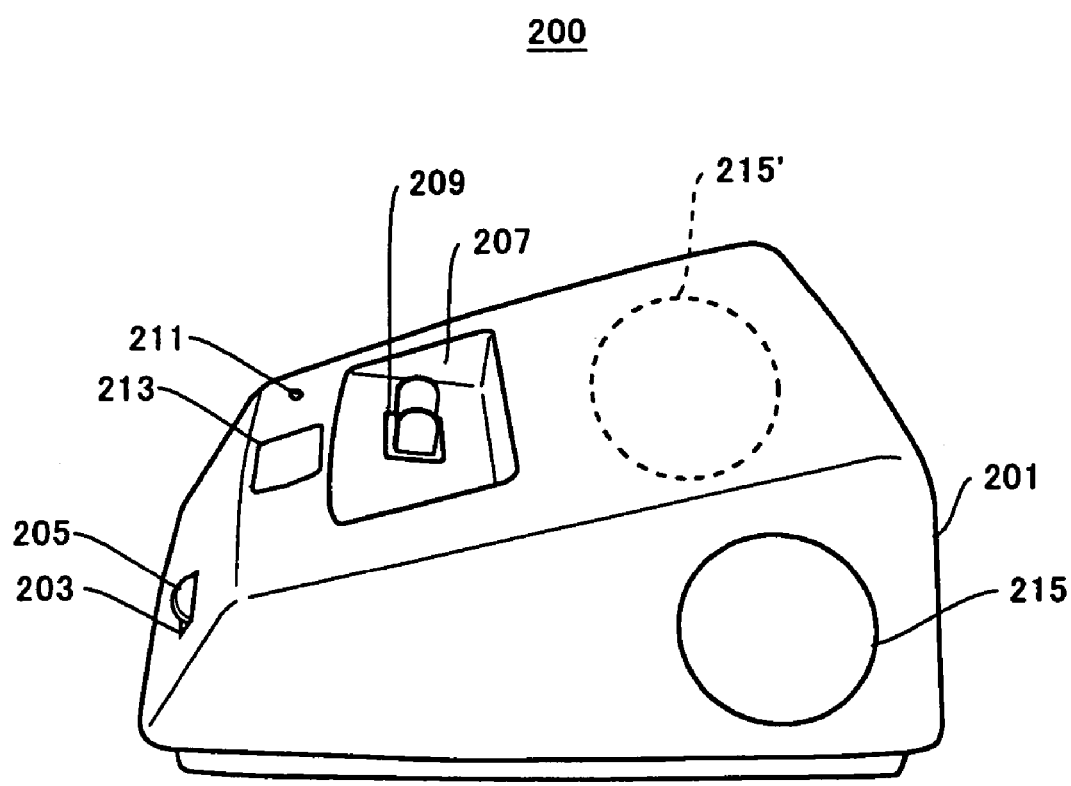
FIG. 3 is a schematic drawing showing an appearance of the example of the speaker system according to the best mode for carrying out the present invention viewed from right above.
Figure 4:
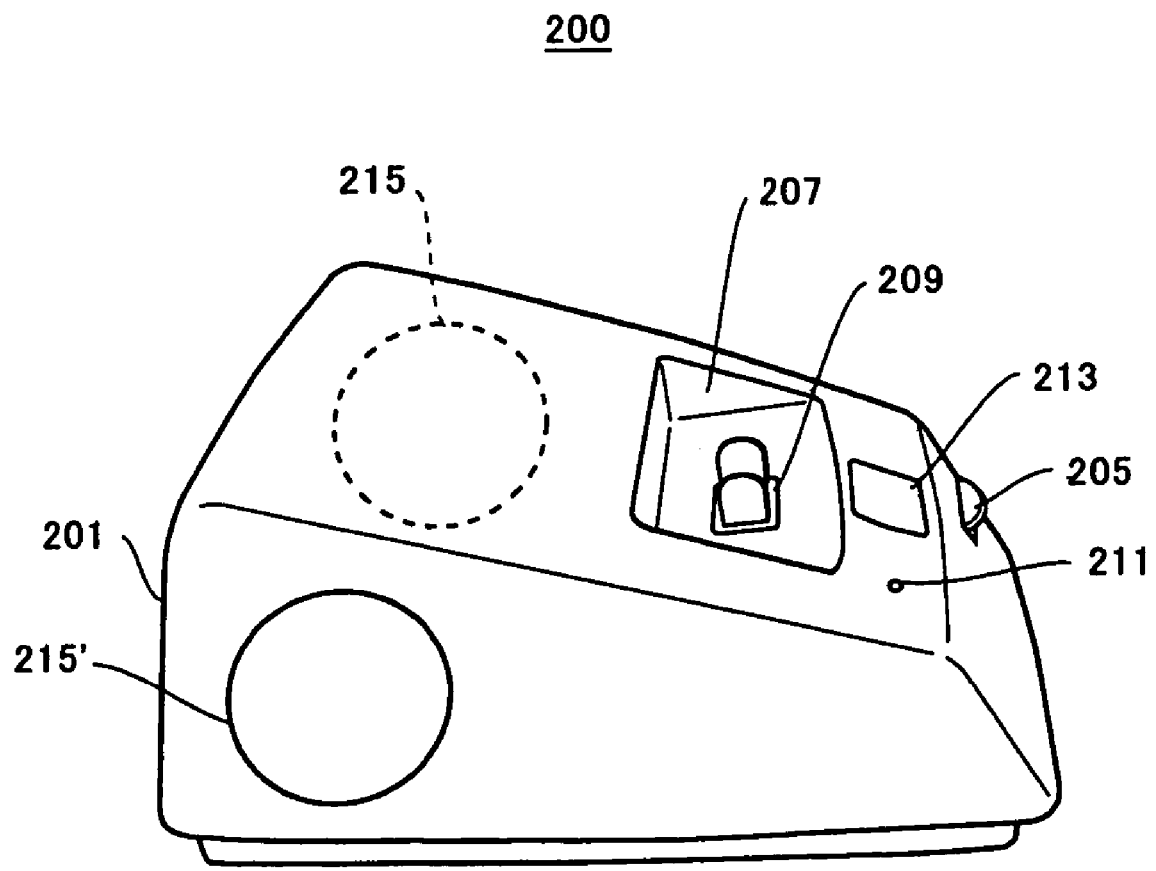
FIG. 4 is a schematic drawing showing an appearance of the example of the speaker system according to the best mode for carrying out the present invention viewed from left above.
Figure 5:
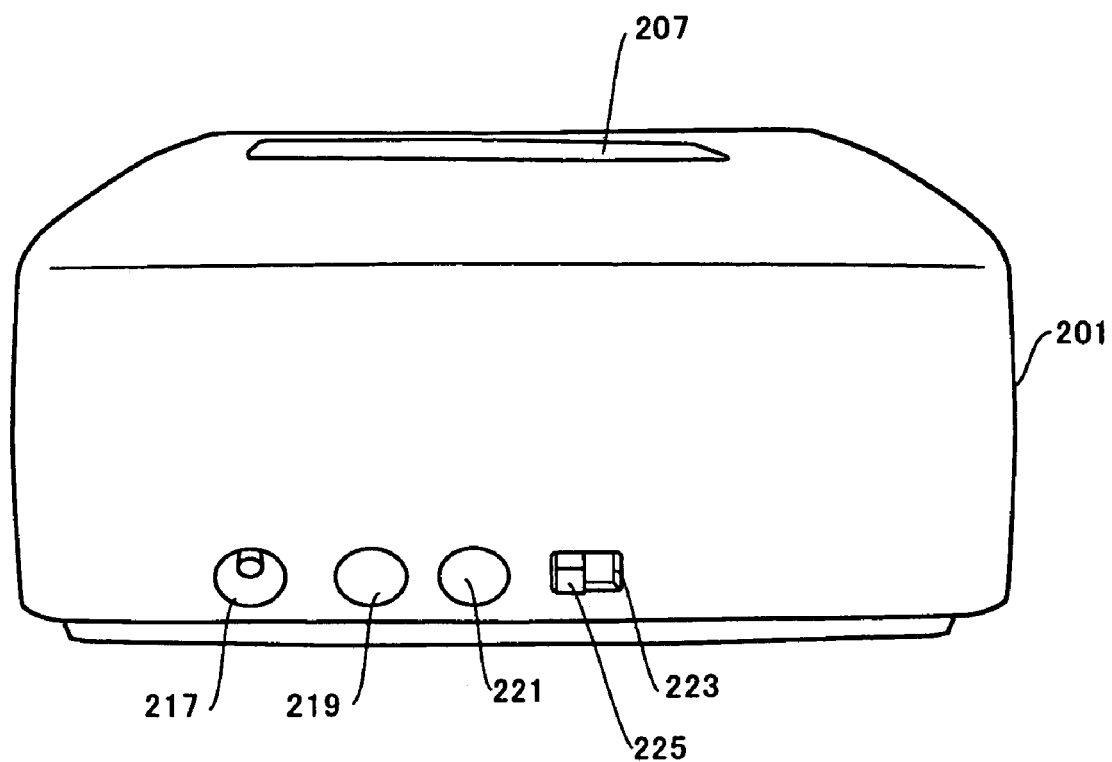
FIG. 5 is a schematic drawing showing an appearance of the example of the speaker system according to the best mode for carrying out the present invention viewed from above in the back.

Referring now to the drawings, examples of the best mode for carrying out the invention will be described in detail below. The present invention is not limited to the examples of the best mode for carrying out the invention.

FIG. 1 shows a schematic front view of an outline of a speaker system 200. The speaker system 200 is an example of the best mode for carrying out the invention. In the drawing, the speaker system 200 is shown with a mobile phone 500 placed thereon. The mobile phone 500 is placed on the upper surface of the speaker system 200 in an upright position. In the placed state, the mobile phone 500 also faces toward the front. The speaker system 200 is used in a state of being installed on a desk or the like.

FIG. 2 to FIG. 5 show an outline of the speaker system 200 when viewed in various viewpoints, respectively. The viewpoints in FIG. 2, FIG. 3, FIG. 4 and FIG. 5 are above in front, right above, left above, and above in the back, respectively.

As shown in these drawings, the speaker system 200 is formed generally into a hexahedron. The front surface and the upper surface are slightly inclined with respect to the vertical and horizontal directions, respectively. The front surface inclines backward and the upper surface inclines forward. Both side surfaces and the back surface extend almost vertically. The distance between both side surfaces are slightly narrowed toward the front. A bottom surface which cannot be seen in the drawing extends horizontally. The hexahedron of the shape as described above constitutes an enclosure 201 of the speaker system 200. The inclination of the front surface and the upper surface and narrowing of the distance between the side surfaces of the enclosure 201 are not necessarily inevitable.

The enclosure 201 is formed with a slit 203 on the front surface on the right side. Part of a disk-shaped dial 205 is exposed from the slit 203. The dial 205 is rotatably mounted in the enclosure 201. The dial 205 is for enabling adjustment of volume, which will be described later.

The enclosure 201 is formed with a recess 207 on the upper surface. The recess 207 is configured so as to be capable of accommodating the bottom of the mobile phone 500. The recess 207 includes a connector 209 on the bottom surface thereof. The connector 209 has a structure to engage a connector on the bottom of the mobile phone 500. Placement of the mobile phone 500 on the speaker system 200 in a state shown in FIG. 1 is enabled by engagement of these connectors. In this state, an electrical connection between the mobile phone 500 and the speaker system 200 is established.

The enclosure 201 is provided with an opening 211 and a push button 213 on the upper surface on the front side of the recess 207. The enclosure 201 is provided with a microphone, described later, inside thereof at the position corresponding to the opening 211. The microphone and the push button 213 are intended for enabling hand-free communication through the mobile phone 500, as described later.

The enclosure 201 is formed with a pair of windows 215, 215' on the rear portion of the side surfaces thereof, respectively. There are provided a pair of speakers, described later, attached inside the windows 215, 215', respectively. The windows 215, 215' serve as windows for radiating sounds from the pair of speakers, respectively.

The pair of speakers are provided inside the enclosure 201 in a state in which back sides thereof substantially face to each other. Since the distance between the side surfaces of the enclosure are slightly narrowed toward the front, their back sides are not exactly face to each other in a narrow sense. However, they are substantially in a relation in which the back sides face to each other. It is also possible to align the side surfaces in parallel with each other so that the pair of speakers are arranged in such a manner that the back sides face exactly to each other.

In this arrangement, even when the distance between the pair of speakers is significantly reduced, derived surround reproduction and stereo reproduction can be sufficiently realized. The present inventors have confirmed it by conducting an experiment.

In this arrangement, the directions of the main axes of sound radiation from the pair of speakers are substantially opposite from each other. Therefore, sounds reaching the audience's ears being in front of the speaker system 200 are mainly the indirect sounds which are the sounds radiated from the pair of speakers and reflected on walls or the like in a room. This contributes to enhance a surround effect and a stereo effect.

The enclosure 201 is formed with four openings 217, 219, 221, 223 at the lower positions of the back surface thereof. There is provided a power input port, described later, inside the enclosure 201 behind the opening 217. An output end of an AC adaptor or the like, not shown, is connected through the opening 217 to the power input port. Accordingly, a direct-current power at a predetermined voltage, which is converted from a commercially supplied alternating-current power is supplied into the enclosure 201. The direct current power serves as a power source for a circuit in the enclosure 201. It is supplied to the mobile phone 500 through the connector 209. The internal battery in the mobile phone 500 is charged by this power.

There is provided a signal input port, described later, in the enclosure 201 behind the opening 219. A signal output terminal of an external device, not shown, is connected to the signal input port through the opening 219. The external device is, for example, a music signal output device or the like which reads music signals or the like from a medium as needed and outputs the same.

There is provided a signal output port, described later, in the enclosure 201 behind the opening 221. A signal input terminal of an external device, not shown, is connected to the signal output port through the opening 221. The external device is, for example, a sound output device such as a headphone for outputting sounds based on supplied signals.

There is provided a change-over switch, described later, in the enclosure 201 behind the opening 223, and a tab 225 is exposed from the opening 223. The tab 225 can be moved laterally within the opening 223. Accordingly, signals which are an origin of sounds generated by the pair of speakers 215, 215' can be switched into signals from the mobile phone 500 or external input signals.

Figure 6:
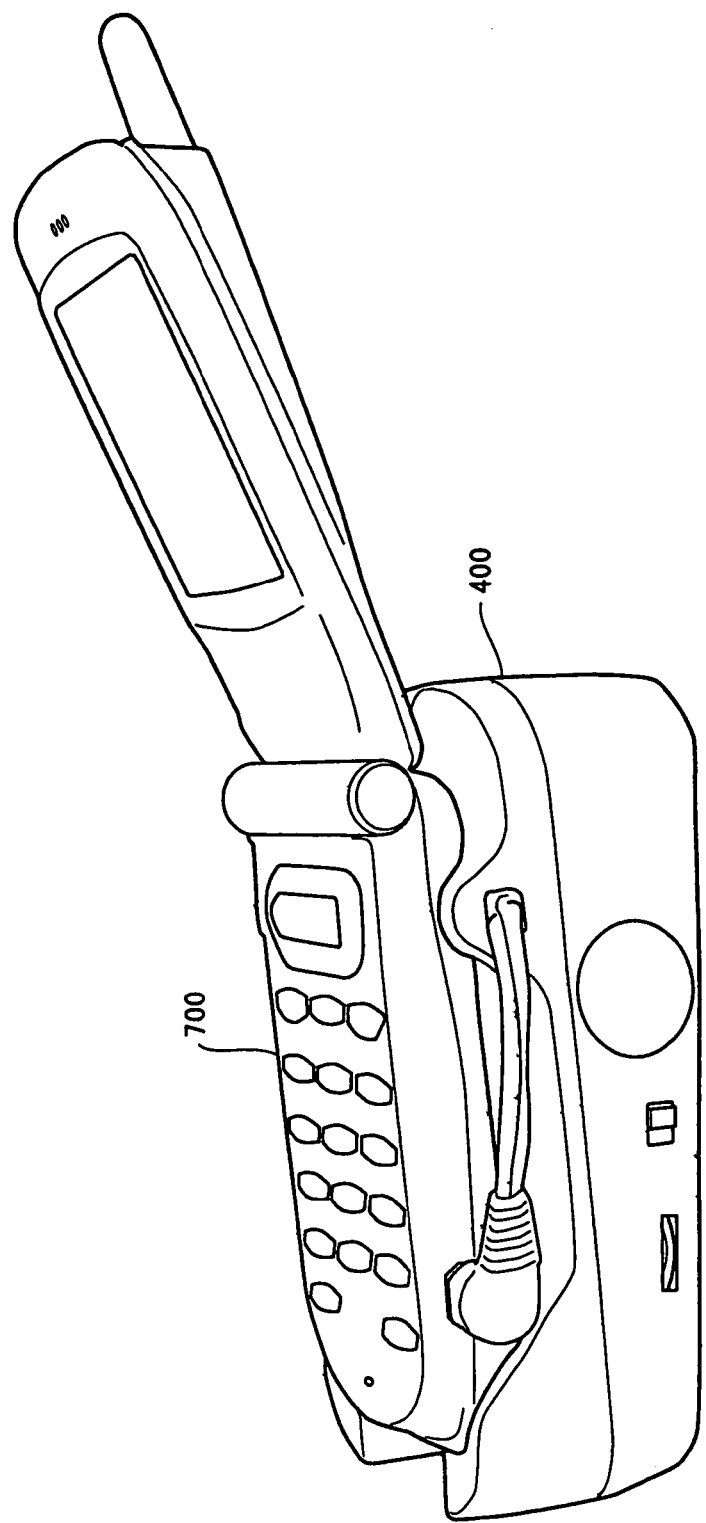
FIG. 6 is a schematic drawing showing an appearance of another example of the speaker system according to the best mode for carrying out the present invention showing a state in which the mobile phone is placed thereon.
Figure 7:
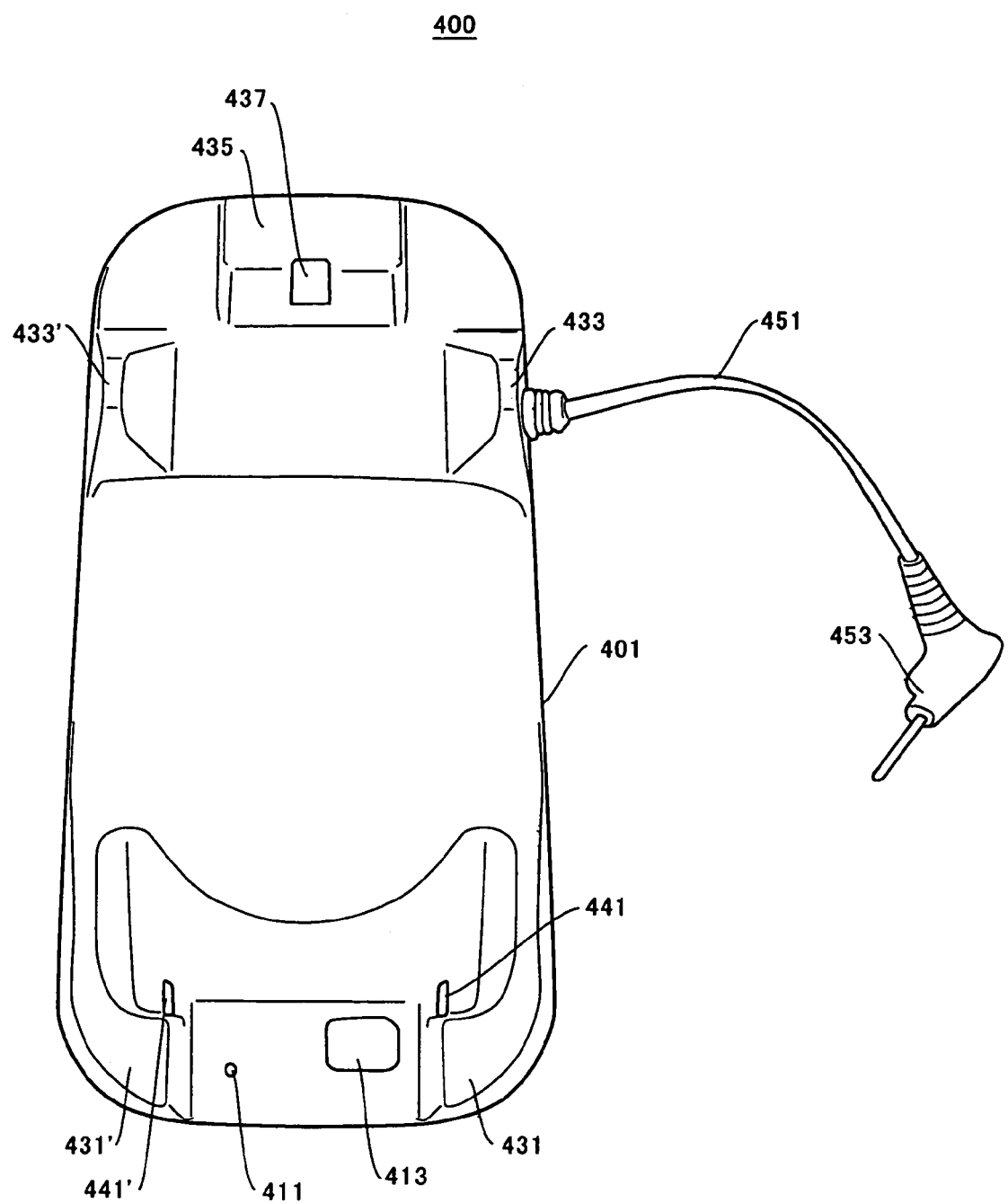
FIG. 7 is a schematic drawing showing an appearance of the example of the speaker system according to the best mode for carrying out the present invention viewed from above in front.
Figure 8:
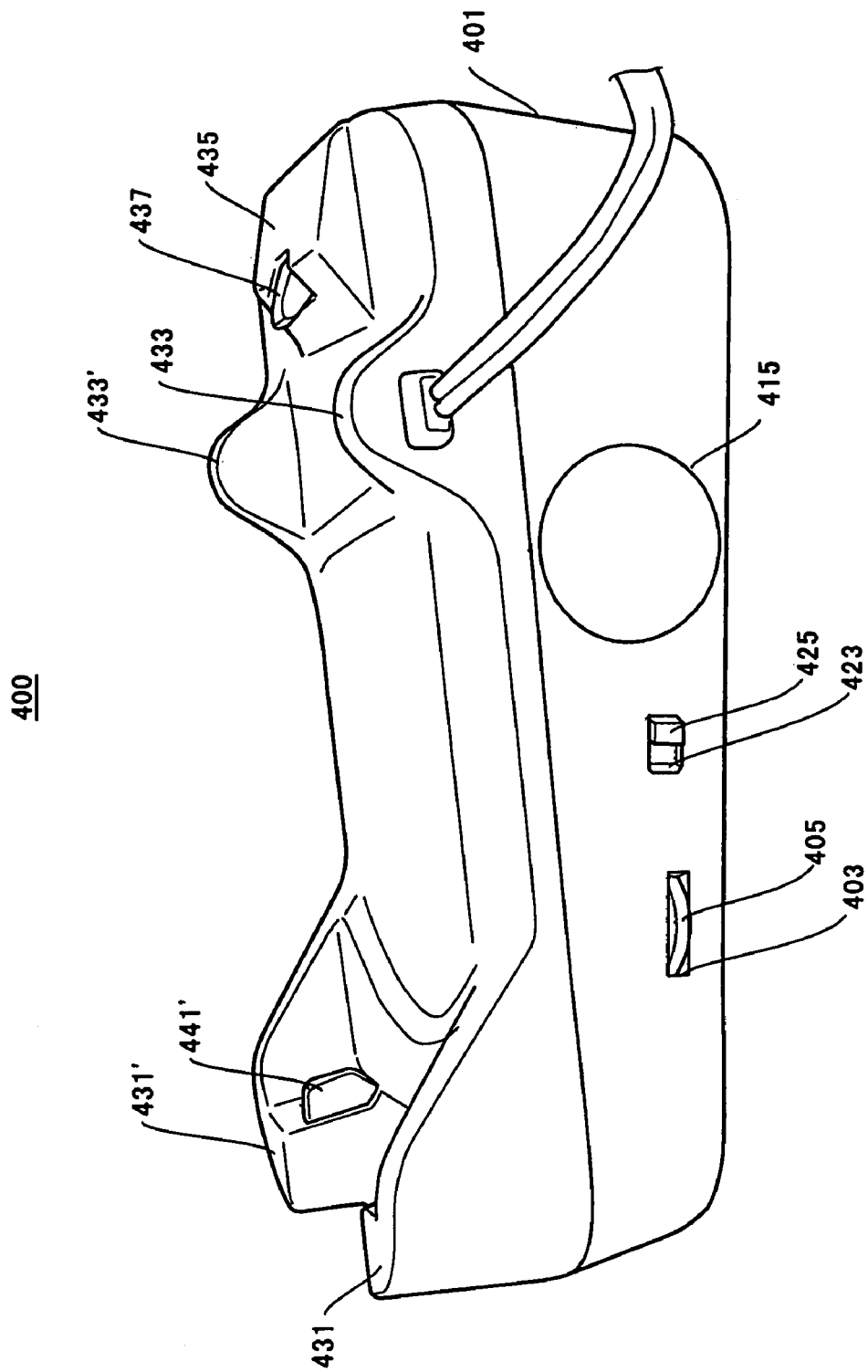
FIG. 8 is a schematic drawing showing an appearance of the example of the speaker system according to the best mode for carrying out the present invention viewed from right above.
Figure 9:
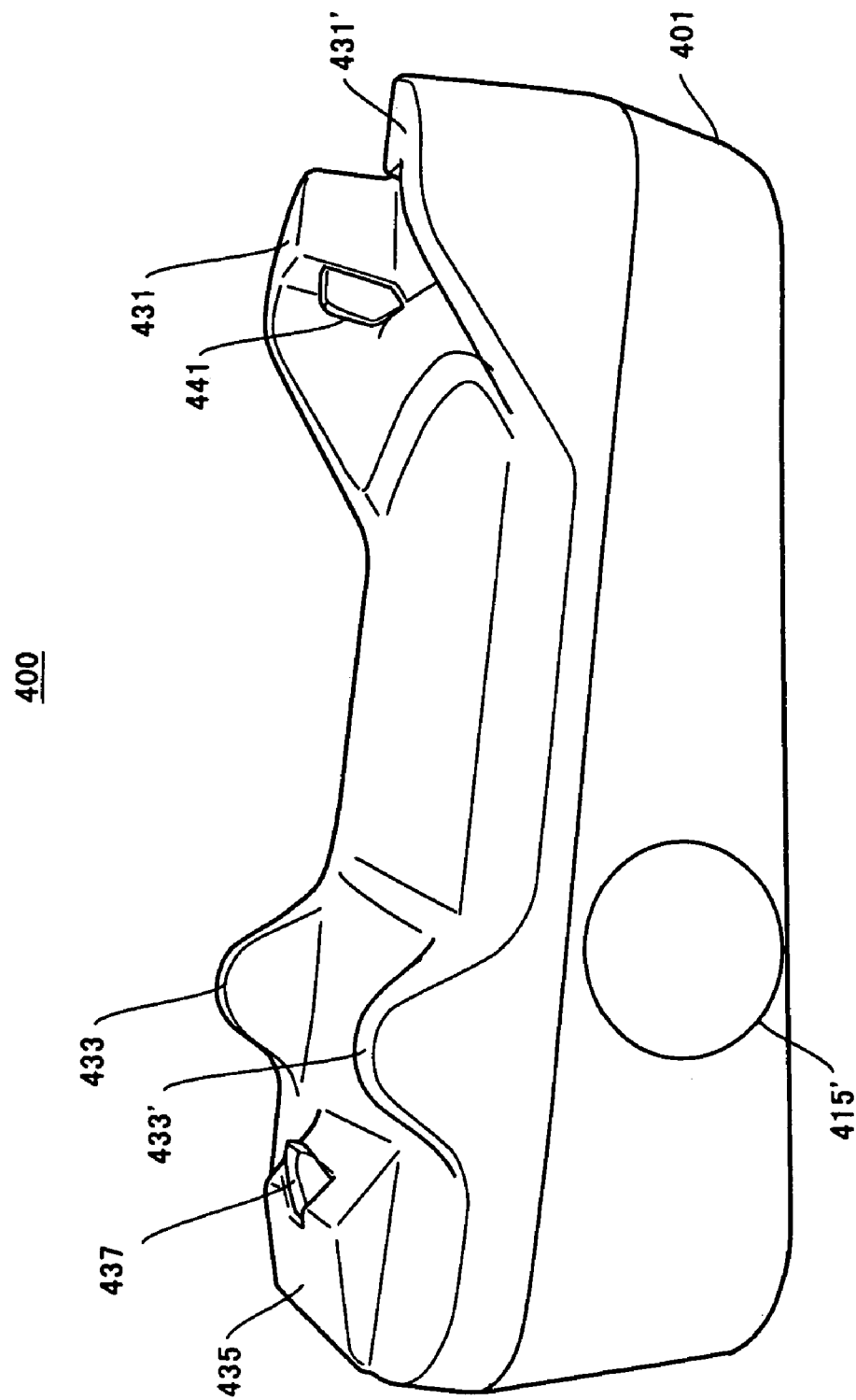
FIG. 9 is a schematic drawing showing an appearance of the example of the speaker system according to the best mode for carrying out the present invention viewed from left above.
Figure 10:
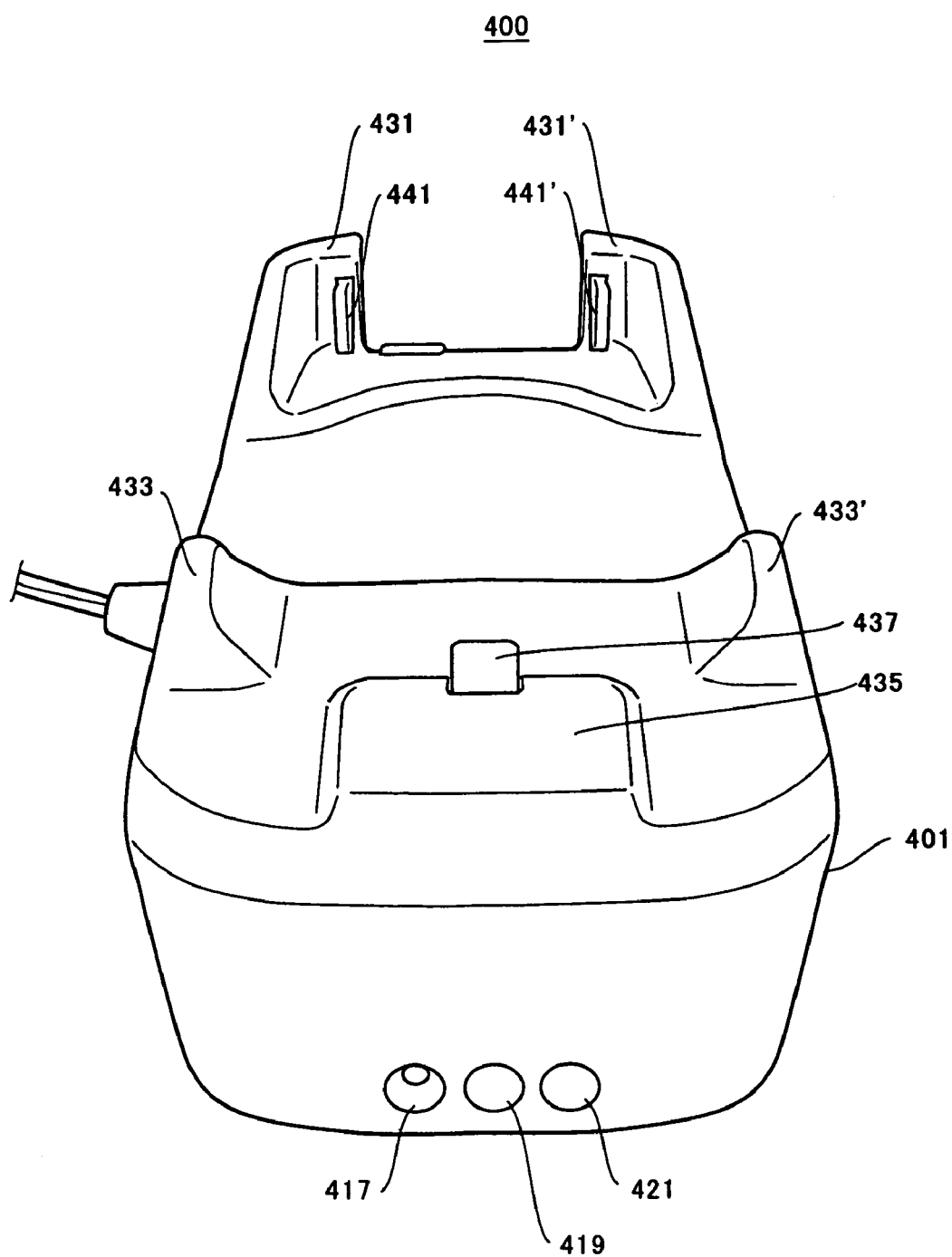
FIG. 10 is a schematic drawing showing an appearance of the example of the speaker system according to the best mode for carrying out the present invention viewed from above in the back.

FIG. 6 is a schematic drawing showing an outline of the speaker system 400 viewed from right above the speaker system 400. The speaker system 400 is an example of the best mode for carrying out the invention. In the drawing, the speaker system 400 is shown together with a mobile phone 700 placed thereon. The mobile phone 700 is of a flip-flop type. In the drawing, a state in which the display is opened is shown. The mobile phone 700 is placed in a state in which the main body is laid on the upper surface of the speaker system 400. In the placed state, a keyboard of the mobile phone 700 comes to the front. The speaker system 400 is used in a state of being placed on a desk or the like.

FIG. 7 to FIG. 10 show schematic drawings showing outlines of the speaker system 400 viewed from various viewpoints. The viewpoints in FIG. 7, FIG. 8, FIG. 9, and FIG. 10 are direction opposing to the upper surface, right above the upper surface, left above the upper surface, and above in the back, respectively.

As shown in the drawings, the speaker system 400 is formed generally into a hexahedron of a boat-shape. The hexahedron as described above constitutes an enclosure 401 of the speaker system 400. The front surface, the back surface, and the side surfaces of the enclosure 401 are substantially vertical surfaces. A bottom surface of the enclosure 401 which cannot be seen in the drawing extends horizontally.

The enclosure 401 is formed with a pair of protrusions 431, 431' at the positions near the front surface of the upper surface thereof so as to be apart laterally from each other. The upper surface is formed with a pair of protrusions 433, 433' at the positions near the back surface so as to be apart laterally from each other. The upper surface is formed with a protrusion 435 at the center of the end on the side of the back surface. A claw 437 is formed on the protrusion 435. A force toward the front is exerted on the claw 437 by a spring or the like provided in the protrusion 435.

A space surrounded by the protrusions 431, 431', 433, 433' and the claw 437 accommodates a main body of the mobile phone 700. In this state, a force toward the front exerted by the claw 437 acts on the mobile phone 700, whereby pressing the end of the mobile phone 700 against the protrusions 431, 431'.

The protrusions 431, 431' include electric contact shoes 441, 441' at the positions where the mobile phone 700 is pressed against. When the mobile phone 700 is placed, the electric contact shoes 441, 441' come into contact with corresponding contact points at the end of the mobile phone 700. A force of a spring or the like is exerted to the electric contact shoes 441, 441' from inside the protrusions 431, 431'. Accordingly, electric contact between the electric contact shoes 441, 441' and the corresponding contact points is established.

The protrusion 433 is provided with an electric cable 451 on the outer surface thereof. The electric cable 451 includes a jack 453 at the end thereof. The jack 453 is inserted into a corresponding jack receptacle of the mobile phone 700 placed on the upper surface thereof. Accordingly, as shown in FIG. 6, electric connection between the speaker system 400 and the mobile phone 700 is established.

Provided between the protrusions 431, 431' are an opening 411 and a push button 413. A microphone, described later, is provided at the position corresponding to the opening 411 in the enclosure 401. The microphone and the push button 413 are for enabling hand-free communication through the mobile phone 700, as described later.

The enclosure 401 is formed with three openings 417, 419, 421 on the lower portion of the back surface. A power input port is provided in the enclosure 401 behind the opening 417. An output terminal of the AC adaptor or the like, not shown, is connected to the power input port hrough the opening 417. Accordingly, a direct-current power at a predetermined voltage converted from commercially supplied alternating-current power is supplied into the enclosure 401. The direct current power serves as a power source for a circuit in the enclosure 401. It is supplied to the mobile phone 700 through the electric contact shoes 441, 441'. The internal battery in the mobile phone 700 is charged by this power.

There is provided a signal input port, described later, behind the opening 419. A signal output terminal of an external device, not shown, is connected to the signal input port through the opening 419. The external device is, for example, a music signal output device or the like which reads music signals or the like from a medium as needed and outputs the same.

There is provided a signal output port, described later, behind the opening 421. A signal input terminal of an external device, not shown, is connected to the signal output port through the opening 421. The external device is, for example, a sound output device for outputting sounds based on supplied signals.

The enclosure 401 is formed with a pair of windows 415, 415' on the rear portion of the side surfaces thereof, respectively. There are provided a pair of speakers, described later, attached inside the windows 415, 415', respectively. The windows 415, 415' serve as windows for radiating sounds from the pair of speakers, respectively.

In this arrangement, even when the distance between the pair of speakers is significantly reduced, derived surround reproduction or stereo reproduction can be sufficiently realized. The present inventors have confirmed it by conducting an experiment.

In this arrangement, the directions of the main axes of sound radiation from the pair of speakers are substantially opposite from each other. Therefore, sounds reaching the audience's ears being in front of the speaker system 400 are mainly the indirect sounds which are the sounds radiated from the pair of speakers and reflected on walls or the like in a room. This contributes to enhance a surround effect and a stereo effect.

The enclosure 401 is formed with a slit 403 on the front surface on the right side. Part of a disk-shaped dial 405 is exposed from the slit 403. The dial 405 is rotatably mounted in the enclosure 401. The dial 405 is for enabling adjustment of volume, which will be described later.

The enclosure 401 is formed with an opening 423 on the right side surface thereof. A change-over switch, described later, is provided behind the opening 423, and the tab 425 is exposed from the opening 423. The tab 425 can be moved laterally within the opening 423. Accordingly, signals which are an origin of sounds generated by the pair or speakers 415, 415' can be switched into signals from the mobile phone 700 or external input signals.

Figure 11:
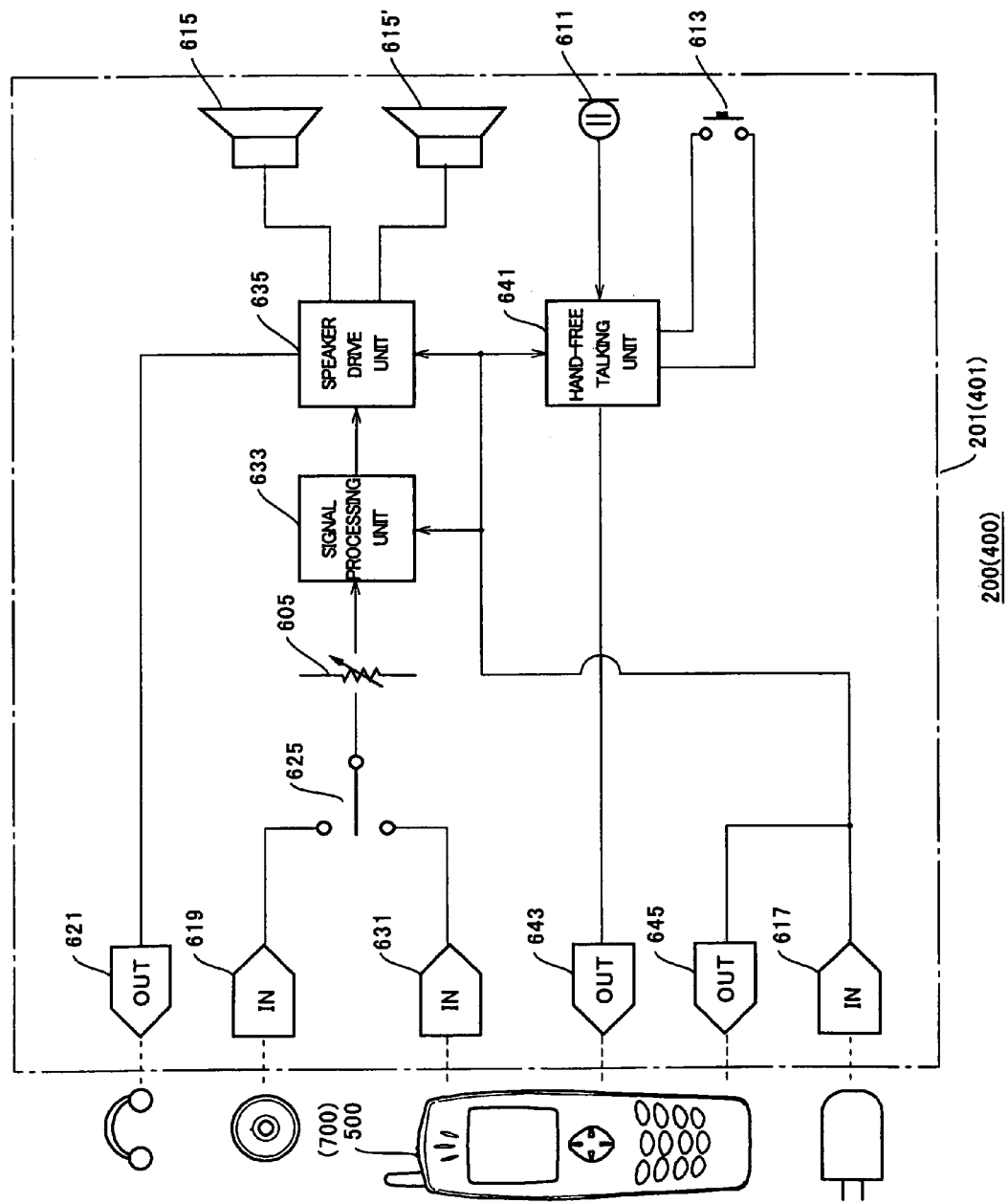
FIG. 11 is a block diagram showing an electrical structure of a speaker system according to the example of the speaker system according to the best mode for carrying out the present invention.

FIG. 11 is a block diagram showing an electric structure of the speaker systems 200 and 400. Either speakers are identical in electric structure. Interiors of the enclosure 201 of the speaker system 200 and the enclosure 401 of the speaker system 400 are configured electrically as shown below.

Although the speaker system will be described as an example of the speaker system 200 hereinafter, it is the same in the case of the speaker system 400.

As shown in the drawing, the speaker system 200 includes signal input ports 631, 619, signal output ports 643, 621, a power input port 617, and power output port 645. The signal input port 631, the signal output port 643, and the power output port 645 exist in the connector 209 described above. The power input port 617, the signal input port 619, and the signal output port 621 exist behind the aforementioned openings 217, 219, and 221, respectively.

In the speaker system 400, the signal input port 631 and the signal output port 643 exist in the jack 453 described above. The power output port 645 corresponds to the aforementioned electric contact shoes 441, 441'. The electric input port 617, the signal input port 619, and the signal output port 621 exist behind the above-described openings 417, 419, and 421, respectively.

One of input signals from the signal input port 631 and the signal input port 619 is selected by the change-over switch 625. The change-over switch 625 includes a tab for operating the same exposed from the enclosure 201 through the aforementioned opening 223.

The input signals from the signal input port 631 are input signals from the mobile phone 200. The input signals from the mobile phone 200 are, for example, received signals, signals delivered by music delivery service, or the like. The input signals from the signal input port 619 are input signals from the external signal source connected to the signal input port 619. The external signal source is, for example, a device for outputting music signals read from a recording medium. The external signal source is not limited thereto, and may be any other suitable signal sources.

The signals selected by the change-over switch are adjusted in signal strength by a volume adjustor 605. Adjustment of the signal strength is performed by rotating the aforementioned dial 205.

The signals which are adjusted in signal strength are supplied to a signal processing unit 633. The signal processing unit 633 performs a predetermined processing on the input signals. The predetermined processing includes, for example, signal processing for derived surround reproduction. Such signal processing is performed by using, for example, a specific LSI. The signal processing is not limited to signal processing for derived surround reproduction, and may be any suitable signal processing such as signal processing, for example, for stereo reproduction.

The output signals of the signal processing unit 633 are supplied to a speaker drive unit 635. The speaker drive unit 635 drives a pair of speakers 615, 615' by speaker drive signals corresponding to the input signals. The speakers 615, 615' are provided at the positions facing the aforementioned windows 215, 215' respectively, so that the sound is emitted outside through the windows 215, 215'.

The output signals in the speaker drive unit 635 can be outputted through the signal output port 621 toward the outside. Accordingly, reproduced sound becomes audible by connecting a body-worn sound reproducing device, such as a headphone, to the signal output port 621. The external device to be connected to the signal output port 621 is not limited to the headphone or the like, and may be any other suitable sound reproducing devices.

A microphone 611 is provided at a position of the opening 211 of the enclosure 201. The output signals of the microphone 611 are supplied to a hand-free talking unit 641. A contact point signals from a push button 613 are also supplied to the hand-free talking unit 641. The push button 613 corresponds to the aforementioned push button 213. The function of the hand-free talking unit 641 becomes effective in conjunction with the operation of the push button 613, and input signals from the microphone 611 are outputted from the signal output port 643 to the mobile phone 500 via the hand-free talking unit 641. Hand-free communication is enabled in this manner. When performing hand-free communication, the change-over switch 625 is switched to the mobile phone 200 side, and the received sound is outputted through the speakers 615, 615'.

A direct-current power supply device, such as an AC adaptor, is connected to the power input port 617. This power is supplied as a source power for the signal processing unit 633, the speaker drive unit 635, and the hand-free talking unit 641. The direct-current power is also supplied to the mobile phone 200 via the power output port 645. The internal battery of the mobile phone 200 is charged by this power.

Figure 12:
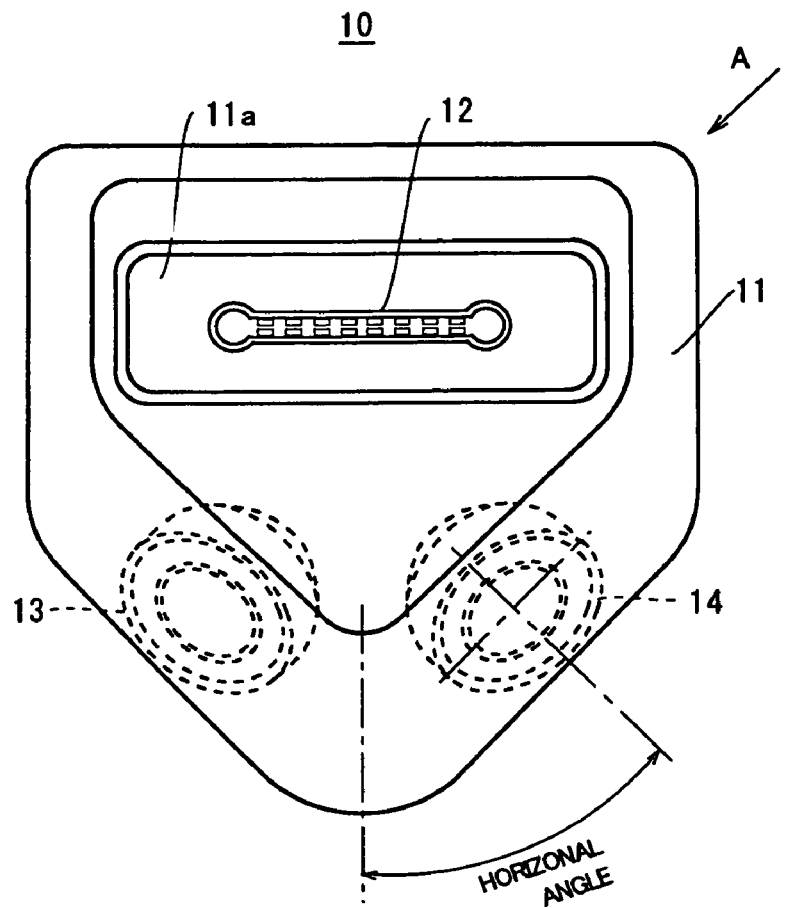
FIG. 12 is a plan view showing the structure of an example of a speaker system according to the best mode for carrying out the present invention.
Figure 15:
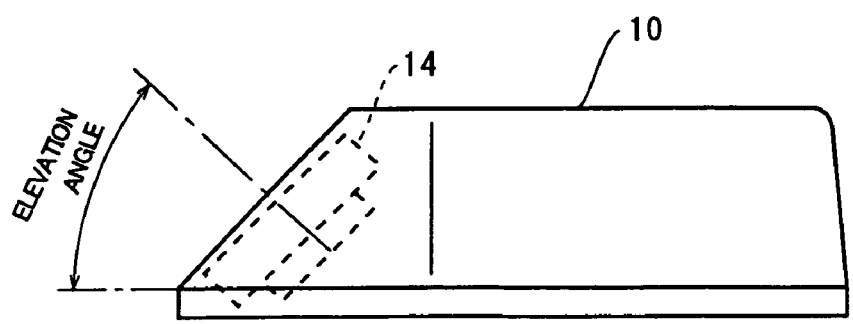
FIG. 15 is an outline view of the structure of the example of the speaker system showing a state viewed from the direction A in FIG. 12 according to the best mode for carrying out the present invention.
Figure 13:
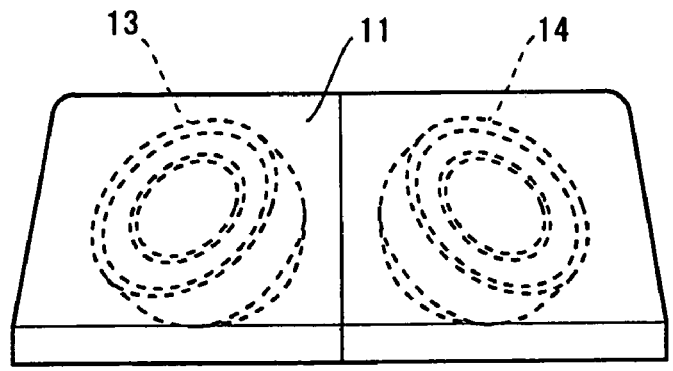
FIG. 13 is a front view showing the structure of the example of the speaker system according to the best mode for carrying out the present invention.
Figure 14:
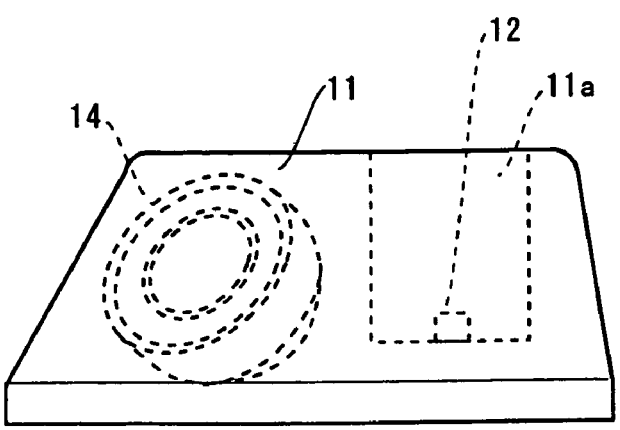
FIG. 14 is a right side view showing the structure of the example of the speaker system according to the best mode for carrying out the present invention.

FIG. 12 is a plan view of an example of a speaker system according to the best mode for carrying out the invention showing a state of the built-in speakers by a broken line; FIG. 13 is a front view showing the state of the built-in speakers by a broken line; FIG. 14 is a right side view showing the state of the built-in speakers and a recess for accommodating the mobile phone by a broken line; and FIG. 15 is an explanatory drawing showing a state of the angle of elevation of the speakers 14 when viewed from a direction A along the mounting surface of the speaker 14 in FIG. 12.

In these drawings, reference numeral 10 designates a speaker system capable of charging the battery of the mobile phone placed thereon, and stereo reproducing music information obtained through the music delivery service.

Reference numeral 11 designates a stand for accommodating the mobile phone in a recess 11a, reference numeral 12 designates a connector arranged on the bottom of the recess 11a for receiving/sending signals with the mobile phone, reference numeral 13 designates a left speaker built in the stand 11, and reference numeral 14 designates a right speaker built in the stand 11.

The center axes of at least a pair of speakers (a speaker 13 and a speaker 14 in this example) have a horizontal angle in a range between 30° and 90° in the lateral horizontal direction from the front (See FIG. 12). The center axes of the speaker 13 and the speaker 14 are directed within the angle of elevation between 0° and 60° with respect to the horizontal plane.

Figure 16:
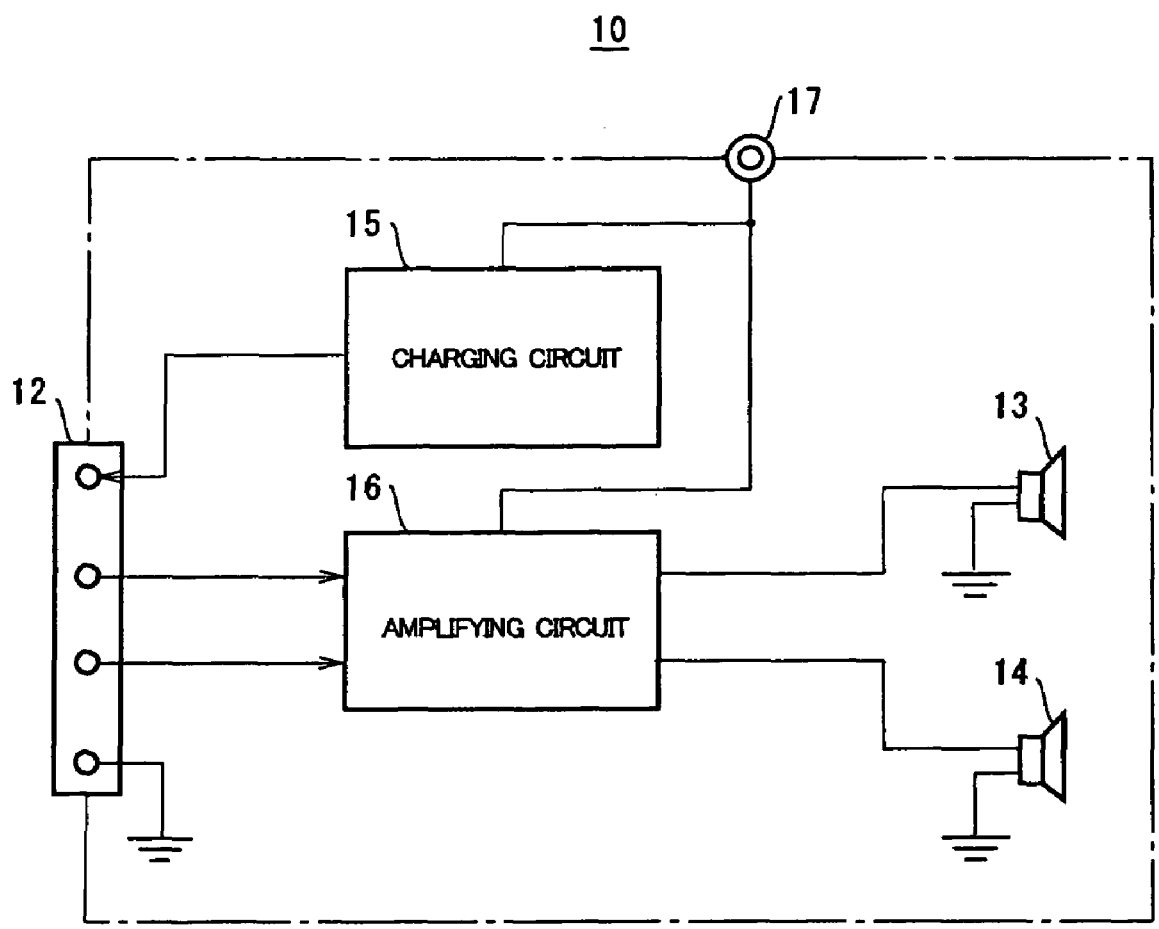
FIG. 16 is a block diagram showing an electrical structure of the example of the speaker system according to the best mode for carrying out the present invention.

FIG. 16 is a block diagram showing an electrical structure of the speaker system 10. In this case, a charging circuit 15 performs predetermined charging operation with respect to the mobile phone via the connector 12, and is configured to receive sound signals from the mobile phone. Then, the sound signals from the mobile phone are stereo-amplified in an amplifying circuit 16, and then outputted from the speaker 13 and the speaker 14. Here, the power required by the charging circuit 15 and the amplifying circuit 16 is supplied to the speaker system 10 from an AC adaptor or the like, not shown, via a terminal 17.

This example is shown presupposing that the music delivery service using the mobile phone enables data accumulation of music information within the mobile phone, and stereo music reproduction is realized by connecting a stereo headphone to the mobile phone. Also, music information reproduced by the mobile phone is assumed to be outputted as analogue signals of a constant level from the connector at the bottom of the mobile phone.

When the mobile phone (not shown) is placed on the speaker system 10 in this example, a connector (not shown) on the bottom of the mobile phone and the connector 12 are brought into a connected state. Accordingly, charging of an internal battery in the mobile phone is executed from the speaker system 10.

In this case, when a music information reproduction command is entered during or after download of the music delivery service, music information signals are outputted from the connector on the bottom of the mobile phone to the connector 12 of the speaker system 10. In this case, digital data obtained through the music delivery service is D/A converted within the mobile phone, and is outputted from the connector on the bottom of the mobile phone as analogue music information signals. The speaker system 10, which has received the music information signals via the connector 12, amplifies the music information in the amplifying circuit 16, and outputs the same from the speaker 13 and the speaker 14.

When the mobile phone, which is completely charged, is placed on the speaker system 10, charging is not performed and only output of the music information is performed.

In this manner, music information being accumulated or having been accumulated via the music delivery service can be reproduced by the mobile phone, which is receiving or has received delivery using the stereo speakers 13, 14 built in the speaker system 10. It will not be necessary to reproduce using the stereo headphone and carrying the mobile phone any longer. Also, it will not be necessary to transfer a memory card inserted into the mobile phone into another specific reproducing device for reproduction any longer.

Furthermore, since the center axes of the speaker 13 and the speaker 14 are directed at a laterally horizontal angle within the range between 30° and 90° from the front, and the center axes of the speaker 13 and the speaker 14 are directed at an angle of elevation within the range between 0° and 60°, sounds radiated form the left and right speakers are spread respectively when reproduction is effected in a state in which the speaker system 10 is placed on a desk or a table, whereby reproduction of music information in association with sufficient stereo feeling is achieved. Since the speakers are arranged at the angles described above, stereo feeling is not impaired even when these two speakers are positioned close to each other. From the same reasons, derived surround reproduction is effectively achieved.

When the center axes of the speaker 13 and the speaker 14 are directed at an angle of 45° in the laterally horizontal direction from the front, further desirable results may be achieved relating to spread of sounds in the lateral direction.

When the center axes of the speaker 13 and the speaker 14 are directed at an angle of elevation within the range between 30° and 45°, further desirable results may be achieved when reproducing in a state of being placed on a table or a desk.

Although a pair of (two) speakers are disposed in the description above, three speakers in total including speakers for stereo reproduction (two) and a subwoofer (one) may be applicable. In this case, it is achieved by arranging an additional speaker and/or a duct (port) not only in front of the stand 11, but also at any other place such as side surfaces, back surface, bottom surface, or upper surface. In this arrangement, a speaker system which is capable of reproducing aggressive low sounds irrespective of its compact configuration is achieved.

Although description has been made while focusing on the music delivery service in the above-described example, it is also possible to apply the invention to a mobile phone which reproduces the contents of a melody signaling an incoming call in stereo.

Moreover, although charging and signal transmission of music information have been made by the connector 12 in the aforementioned description, the present invention may be applied also in a case where separate connectors or terminals are used respectively.

INDUSTRIAL APPLICABILITY

A speaker system according to the present invention is suitable to be used not only as a stand for a mobile phone capable of power supply to the mobile phone and hand-free communication, but also as a desktop audio device for effecting derived surround reproduction or stereo reproduction of music delivered through the mobile phone.

The invention claimed is:

1. A speaker system in a stand having a function for charging a battery of a mobile phone placed on a placing section of the stand comprising: a stand having a recess for accommodating a mobile phone; a connector in the recess for supplying power and sending/receiving of signals with respect to a mobile phone placed in the recess: amplifying means in the stand for charging a battery of the mobile phone placed in the recess; amplifying means in the stand for amplifying sound signals received from the mobile phone via the connector; and at least one pair of right and left speakers in a front of the stand for outputting sounds amplified by the amplifying means; wherein center axes of the right and left speakers of said at least one pair of speakers are directed from a front of the stand at an angle within a range between 30° and 90° in a lateral horizontal direction with respect to a center line extending through a midpoint between the center axes of the right and left speakers and at an elevating angle between 0° and 60° with respect to a horizontal plane.

2. A speaker system according to claim 1, wherein the amplifying means is capable of amplifying stereo signals.

3. A speaker system according to claim 1 or claim 2, wherein the center axes of the right and left speakers of the at least one pair of speakers are directed at an angle of 45° from the front of the stand in the laterally horizontal direction.

4. A speaker system according to claim 1, wherein the center axes of the right and left speakers of the at least one pair of speakers are directed at an elevating angle between 30° and 45°.

5. A speaker system according to claim 1, wherein stereo sounds from the mobile phone which have received music information through a music delivery service are outputted.

* * * * *